(12) United States Patent
Karlsson et al.

(10) Patent No.: US 7,093,848 B2
(45) Date of Patent: Aug. 22, 2006

(54) MOTOR VEHICLE OCCUPANT IMPACT PROTECTION ARRANGEMENT

(75) Inventors: Lennart Karlsson, Alingsås (SE); Arne Olsson, Frändefors (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/395,751

(22) Filed: Mar. 24, 2003

(65) Prior Publication Data

US 2003/0184059 A1 Oct. 2, 2003

(30) Foreign Application Priority Data

Mar. 26, 2002 (SE) ..................... 0200905

(51) Int. Cl.
*B60R 21/20* (2006.01)

(52) U.S. Cl. .................... 280/728.3

(58) Field of Classification Search ............ 280/728.2, 280/728.3, 731, 732, 730.1, 730.2
See application file for complete search history.

(56) References Cited

U.S. PATENT DOCUMENTS

| | | | |
|---|---|---|---|
| 3,778,085 A | 12/1973 | Lipkin | |
| 4,332,398 A | 6/1982 | Smith | |
| 5,096,222 A | 3/1992 | Komerska et al. | |
| 5,431,435 A | 7/1995 | Wilson | |
| 5,470,098 A | 11/1995 | Szigethy et al. | |
| 5,556,126 A | 9/1996 | Lee | |
| 5,664,801 A | 9/1997 | Gray et al. | |
| 5,678,853 A * | 10/1997 | Maly ............... | 280/730.2 |
| 5,687,987 A | 11/1997 | Spencer et al. | |
| 5,690,354 A | 11/1997 | Logan et al. | |
| 5,749,597 A | 5/1998 | Saderholm | |
| 5,752,714 A | 5/1998 | Pripps et al. | |
| 5,755,457 A | 5/1998 | Specht | |
| 5,775,724 A | 7/1998 | Tonooka et al. | |
| 5,791,680 A | 8/1998 | Dyer | |
| 5,799,971 A | 9/1998 | Asada | |
| 5,806,882 A | 9/1998 | Stein et al. | |
| 5,897,134 A | 4/1999 | Stein et al. | |
| 5,934,700 A | 8/1999 | Disam et al. | |
| 5,967,546 A | 10/1999 | Homier et al. | |
| 5,979,929 A | 11/1999 | Stanger et al. | |
| 6,045,151 A * | 4/2000 | Wu ............... | 280/728.3 |
| 6,095,550 A * | 8/2000 | O'Loughlin et al. ..... | 280/730.1 |
| 6,103,984 A | 8/2000 | Bowers et al. | |
| 6,161,865 A | 12/2000 | Rose et al. | |
| 6,196,576 B1 * | 3/2001 | Sutherland et al. ...... | 280/730.1 |
| 6,209,907 B1 | 4/2001 | Fischer | |

(Continued)

FOREIGN PATENT DOCUMENTS

DE 39 18 281 12/1990

(Continued)

*Primary Examiner*—Faye M. Fleming
(74) *Attorney, Agent, or Firm*—MacMillan, Sobanski & Todd, LLC

(57) ABSTRACT

The present invention relates to a motor vehicle occupant impact protection arrangement. The motor vehicle occupant impact protection arrangement comprises an airbag device within a housing, an airbag device launch trigger, triggering the launching of the airbag device upon a motor vehicle impact, and a sheathing, such as a dashboard in an occupant compartment of the motor vehicle, to which the housing is connected, and behind which, in relation to the occupant, the airbag device is located. The sheathing is having a mouth through which the airbag device, guided by the housing, is launched into the occupant compartment. The sheathing, after the launch of the airbag device, is adapted to essentially return to original state and to essentially close the mouth.

15 Claims, 2 Drawing Sheets

U.S. PATENT DOCUMENTS

| | | |
|---|---|---|
| 6,224,087 B1 | 5/2001 | Stütz et al. |
| 6,237,934 B1 * | 5/2001 | Harrell et al. ........... 280/728.3 |
| 6,293,580 B1 * | 9/2001 | Lachat et al. ............ 280/728.3 |
| 6,655,711 B1 * | 12/2003 | Labrie et al. ............ 280/728.3 |
| 2004/0201205 A1 * | 10/2004 | Webber ................... 280/728.3 |

FOREIGN PATENT DOCUMENTS

| | | |
|---|---|---|
| DE | 42 17 177 | 11/1993 |
| DE | 42 26 316 | 2/1994 |
| EP | 1 038 737 | 9/2000 |
| FR | 2 782 302 | 2/2000 |
| JP | 07164989 A * | 6/1995 |
| WO | 02/34580 | 5/2002 |

* cited by examiner

MOTOR VEHICLE OCCUPANT IMPACT PROTECTION ARRANGEMENT

CROSS REFERENCE TO RELATED APPLICATIONS

This application claims priority to Swedish Patent Application No. 0200905-8 filed Mar. 26, 2002, the disclosures of which are incorporated herein by reference.

FIELD OF THE INVENTION

The present invention relates to a motor vehicle occupant impact protection arrangement. The motor vehicle occupant impact protection arrangement comprising an airbag device within a housing, an airbag device launch trigger, triggering the launching of the airbag device upon a motor vehicle impact, and a sheathing, such as a dashboard in an occupant compartment of the motor vehicle, to which the housing is connected, and behind which, in relation to the occupant, the airbag device is located.

BACKGROUND OF THE INVENTION

Airbags of different types are present in many modern motor vehicles. They provide a means for protecting the occupants of the motor vehicle in the case of an impact and can for example be located under the dashboard, in the steering wheel, in the occupant seat or around a door opening. The different types are usually based on a similar technological idea of an inflatable airbag triggered upon an impact. The impact results in an explosive inflation of the airbag, which as a consequence breaks its way out through a path or housing and into the occupant compartment of the motor vehicle. In the occupant compartment, the occupant is due to the impact thrown towards the airbag that receives parts of the kinetic energy of the occupant and hence protects the occupant from being severely injured in a so called first impact. The airbag subsequently deflates and looses its ability to further protect the occupant.

However, the occupant may be injured during the first stage of launching the airbag since many airbags are located behind lids or other covers that are closed under normal use of the motor vehicle. The closure mechanism of the cover may consist of a closing latch or of a notch in the cover material, both of which need a specific amount of energy to open or to rupture, which the airbag provides during the launch. The airbag is adapted to build up such an amount of energy within itself, as to overcome the initial opening energy needed to break loose into the occupant compartment before further inflation and intended use. Since the opening energy needed is often significant, the cover is flung open with considerable force and speed. This may in turn result in vehicle parts flying around in the occupant compartment and accidentally hitting and causing injury to the occupant.

A further inconvenience is that after the first impact there is, in many cases, a so called second impact caused by the large amount of kinetic energy involved in a motor vehicle accident. Since the airbag looses its protective ability after the deflation at the first impact, the occupant may instead, in a second impact, be thrown against a dashboard that now has open covers behind which the airbag formerly was located. The second impact may thus also result in occupant injury.

After an impact, not only exterior parts damaged in the impact need to be replaced or mended. Also interior parts, such as the dashboard behind which the airbag was formerly located, may be damaged since closing mechanisms of the lid or other covers may have been ruptured due to the inflation of the airbag. Repair work may be costly and spare parts such as dashboards are in general expensive. These costs are usually covered by insurance companies, but are transferred to the motor vehicle owners by increased insurance fees.

SUMMARY OF THE INVENTION

The object of the present invention is to provide a motor occupant impact protection arrangement that overcomes at least some of the above mentioned matters and to present an improved impact protection arrangement.

According to the invention there is provided a motor vehicle occupant impact protection arrangement comprising an airbag device within a housing, an airbag device launch trigger, 4, 15, triggering the launching of the airbag device upon a motor vehicle impact, and a sheathing, such as a dashboard in an occupant compartment of the motor vehicle, to which the housing is connected, and behind which, in relation to the occupant, the airbag device is located. The sheathing is having a mouth through which the airbag device, guided by the housing, is launched into the occupant compartment. The sheathing is also, after the launch of the airbag device, adapted to essentially return to original state and to essentially close the mouth. This way, a motor vehicle occupant impact protection arrangement is provided, in which the sheathing, after an impact, subsequent launch and final deflation of the airbag device, is essentially returning to original position and state, and hence being kept intact for the occasion when there is a so called second impact. It is not damaged in any essential part by the opening and closing of the mouth, and hence not in need of being replaced. This way, the costs for insurance companies and the owners of motor vehicles are kept to a minimum.

In an embodiment of the invention the mouth can be an integrated part of and, or an aperture in the sheathing. This feature enables the airbag device to, upon launching, easily and without considerable force open up the mouth and give way for inflation of the airbag device in the occupant compartment. It also contributes to make the sheathing reusable, since there is not any ruptured opening mechanism of the mouth.

In a further embodiment of the motor vehicle occupant impact protection arrangement, the housing is forming wedge-shaped sliding surfaces for the airbag device, the surfaces converging towards the mouth. This feature has the added advantage that when the airbag device is inflating, the force of the inflated atmosphere within the airbag is urging the wedge-shaped housing and the aperture in the sheathing to open in a smooth manner. Since the airbag device inflates in a continuous manner It does not build up an internal pressure leading to an explosive inflation within the occupant compartment like many airbags according to prior art. The sliding surfaces of the housing adds to this advantage and reduces the friction between the airbag material and the housing.

Preferably, the housing, in the part connected to the sheathing, is adapted to form resilient jaws. The housing is more easily opened to release the airbag into the occupant compartment. This feature can be combined with a feature in which the housing in combination with the sheathing is forming a resilient part. The part is suitably adapted to enable opening of the mouth against spring action and essentially closing of the mouth. The choice of material in and thickness of the sheathing in combination with the connection between the sheathing and the housing are of importance to the outcome of the resilience of the opening and closing of the mouth. Since the main purpose of the sheathing, apart from covering devices behind it, is to contribute to the protection of the occupant in case of an accident, it can continue to do so also after an impact. The sheathing is adapted to withstand the deformation caused by the opening of the mouth, and to resume the original state after the deflation of the airbag.

Suitably, the airbag device is comprising an inflatable airbag, which, upon triggering, is adapted to, against spring action, press the mouth to open, and to inflate in the occupant compartment.

A further advantage is provided by the airbag device, which is replaceable after fulfilling its purpose at a motor vehicle impact. This feature adds to the cost efficiency of the arrangement. The airbag device is replaceable by admission at a point on the sheathing essentially transversal to the direction of inflation of the airbag device. The airbag device behind a dashboard of a motor vehicle is preferably replaceable by admission at a point on the sheathing reachable from a motor vehicle door opening.

BRIEF DESCRIPTION OF THE DRAWINGS

A currently preferred embodiment of the present invention will now be described in more detail, with reference to the accompanying drawings.

DETAILED DESCRIPTION OF THE INVENTION

A first embodiment of the present invention related to a motor vehicle occupant protection arrangement will be described in more detail in the following, with reference to the accompanying drawings.

Figure 1:
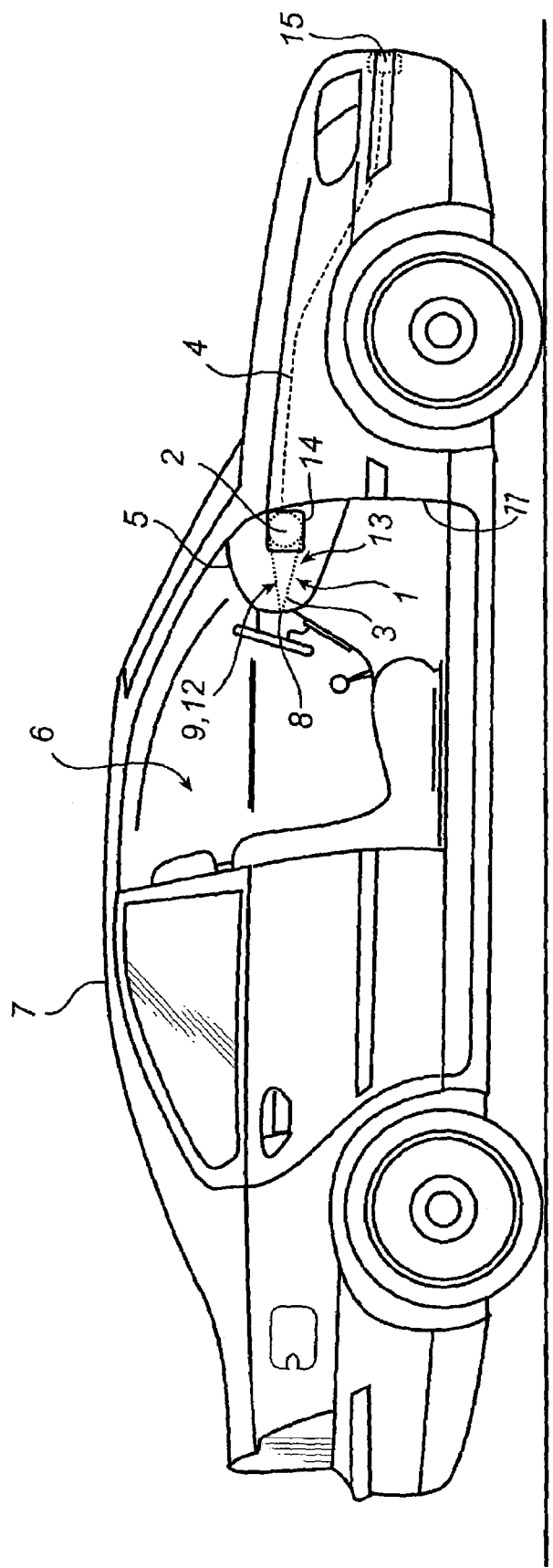
FIG. 1 is a side view of a motor vehicle with a motor vehicle occupant protection arrangement according to a preferred embodiment of the present invention.
Figure 2A:
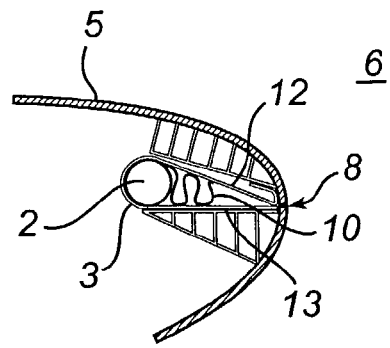
FIG. 2, a–d is a cross-section of an airbag device during the steps of inflation and deflation of an airbag in a motor vehicle occupant impact protection arrangement, according to a preferred embodiment of the present invention.
Figure 2B:
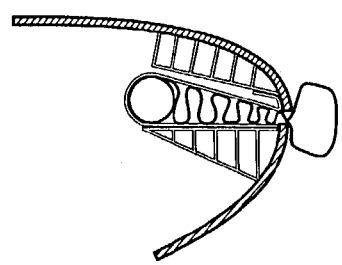
Figure 2C:
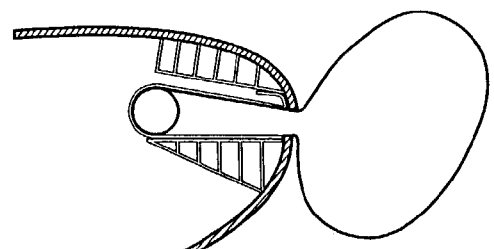
Figure 2D:
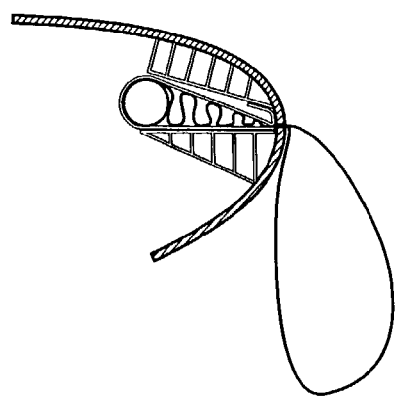

Referring now to FIG. 1, a motor vehicle occupant protection arrangement 1 is located in a motor vehicle 7 behind a dashboard 5 in the occupant compartment 6. The occupant protection arrangement 1 is triggered upon a motor vehicle 7 accident, such as an impact. The occupant protection arrangement 1 comprises an airbag 10, in an airbag device 2, which in turn is located in a housing 3. The housing 3 is adapted to hold the airbag device 2 and guide the airbag 10 out through a mouth 8 in the dashboard 5 into the occupant compartment 6. The housing 3 is forming sliding surfaces 9 for the guidance of the airbag 10. The mouth 8 in the dashboard 5 is an aperture in the dashboard, is such a way that the upper 12 and lower 13 parts of the mouth 8 are kept in close contact with each other, but not locked together by any closing mechanism. The holding mechanism of the mouth 8 is produced by the inherent stiffness of the dashboard 5 and of the resilience of the housing 3. The upper part 12 of the mouth 8, i.e. the upper part of the aperture in the dashboard 5, is connected to the upper part of the housing 3. And likewise, the lower part 13 of the mouth 8, i.e. the lower part of the dashboard 5, is connected to the lower part of the housing 3.

FIG. 1 shows a motor vehicle 7 in which a motor vehicle occupant impact protection arrangement according to a preferred embodiment of the present invention 1 is situated.

On the side of the dashboard 5 facing a motor vehicle door opening 11, an airbag opening 14 is provided to make the airbag device 2 easily accessible for replacement after use. The airbag device 2 is re in the transversal direction of the direction of inflation of the airbag 10.

With reference now to FIG. 2, a–d, the function of the occupant protection arrangement 1 will be described. In FIG. 2a the airbag device 2 is not yet launched and hence the mouth 8 is closed and the dashboard 5 is in its original state or position. In Fig. 2b the airbag device 2 is triggered and launches the airbag 10 through the housing 3 into the occupant compartment 6. The pressure within the airbag 10 is increasing and leading to the inflation of the airbag 10. The inflation is in turn leading to the expansion of the airbag 10 and the expansion pressure on the housing 3 is urging the housing 3 and dashboard 5 to separate the upper and lower parts of the mouth, 12 and 13 respectively, opening the mouth 8. FIG. 2c the housing 3 and the mouth 7 in the dashboard 5 are fully opened and the airbag 10 is fully inflated. In FIG. 2d the airbag 10 is deflated and the housing 3 and the mouth 8 in the dashboard 5 have resumed their original state or position.

Although the present invention has been described in connection with particular embodiments thereof, it is to be understood that various modifications, alterations and adaptations may be made by those skilled in the art without departing from the spirit and scope of the invention.

As mentioned above, the motor vehicle occupant protection arrangement may be placed at other locations within the motor vehicle, such as around door openings, within a steering wheel, or within occupant seats. It may also be designed to have a mouth that only on one side is connected to a resilient material such as the sheathing. The other side may be connected to, in relation to the flexibility of the sheathing, rigid part of the motor vehicle.

The housing may not be entirely wedge-shaped, but if needed, deviate somewhat from that shape.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A motor vehicle occupant impact protection arrangement comprising:
   an airbag device within a housing adapted to be launched upon a motor vehicle impact; and
   a sheathing in an occupant compartment of the motor vehicle to which said housing is connected, and behind which, in relation to the occupant, said airbag device is located, wherein said sheathing has a mouth defined by an aperture formed through said sheathing through which said airbag device, guided by said housing, is launched into said occupant compartment, and in that said sheathing, after the launch of said airbag device, is essentially returned to an original state, said mouth being essentially closed.

2. A motor vehicle occupant impact protection arrangement according to claim 1, wherein said mouth is an integrated part of said sheathing.

3. A motor vehicle occupant impact protection arrangement according to claim 1, wherein said housing is forming wedge-shaped sliding surfaces for said airbag device, said surfaces converging towards said mouth.

4. A motor vehicle occupant impact protection arrangement according to claim 3, wherein said housing, in the part connected to the sheathing, is adapted to form resilient jaws.

5. A motor vehicle occupant impact protection arrangement according to claim 4, wherein said housing in combination with said sheathing is forming a resilient part adapted to enable opening of said mouth against spring action and essentially closing of said mouth.

6. A motor vehicle occupant impact protection arrangement according to claim 1, wherein said airbag device is compromising an inflatable airbag, which, upon triggering, is adapted to, against spring action, pressing said mouth to open, and to inflate in said occupant compartment.

7. A motor vehicle occupant impact protection arrangement according to claim 1, wherein said airbag device is replaceable after fulfilling its purpose at a motor vehicle impact.

8. A motor vehicle occupant impact protection arrangement according to claim 7, wherein said airbag device is replaceable by access at a point on said sheathing essentially transversal to the direction of said airbag device.

9. A motor vehicle occupant impact protection arrangement according to claim 8, wherein said airbag device is replaceable by access at a point on said sheathing reachable from a motor vehicle door opening.

10. A motor vehicle occupant impact protection arrangement according to claim 1, including an airbag launch trigger for triggering the launching of said airbag device upon a motor vehicle impact.

11. A motor vehicle occupant impact protection arrangement according to claim 1, wherein the sheathing is a covering of a dashboard in an occupant compartment of the motor vehicle.

12. A motor vehicle occupant impact protection arrangement comprising:
   an airbag device within a housing adapted to be launched upon a motor vehicle impact; and
   a sheathing in an occupant compartment of the motor vehicle to which said housing is connected, and behind which, in relation to the occupant, said airbag device is located, wherein said sheathing has a mouth formed therein, through which said airbag device, guided by said housing, is launched into said occupant compartment, such that said sheathing, after the launch of said airbag device, is essentially returned to an original state, said mouth being essentially closed, and wherein said housing defines wedge-shaped sliding surfaces for said airbag device, said sliding surfaces converging toward said mouth.

13. A motor vehicle occupant impact protection arrangement according to claim 12, wherein said housing defines an upper wedge-shaped sliding surface and a lower wedge-shaped sliding surface, and wherein at least one of said upper and lower wedge-shaped sliding surfaces is connected to said sheathing about said mouth.

14. A motor vehicle occupant impact protection arrangement comprising:
   an airbag device within a housing adapted to be launched upon a motor vehicle impact; and
   a sheathing in an occupant compartment of the motor vehicle to which said housing is connected, and behind which, in relation to the occupant, said airbag device is located, wherein said sheathing has a mouth formed therein through which said airbag device, guided by said housing, is launched into said occupant compartment, such that said sheathing, after the launch of said airbag device, is essentially returned to an original state, said mouth being essentially closed, and wherein a portion of said housing is connected to said sheathing about said mouth, said portion of said housing defining resilient jaws.

15. A motor vehicle occupant impact protection arrangement according to claim 14, wherein said resilient jaws are caused to open during the launch of said airbag device, said resilient jaws being caused to close after the launch of said airbag device, thereby closing said mouth.

* * * * *

UNITED STATES PATENT AND TRADEMARK OFFICE
CERTIFICATE OF CORRECTION

PATENT NO. : 7,093,848 B2
APPLICATION NO. : 10/395751
DATED : August 22, 2006
INVENTOR(S) : Lennart Karlsson et al.

It is certified that error appears in the above-identified patent and that said Letters Patent is hereby corrected as shown below:

Column 5, Claim 6, Line 11, delete "compromising" and insert --comprising--.
Column 5, Claim 8, Line 21, after "direction" insert --of inflation--.

Signed and Sealed this

Twenty-first Day of November, 2006

JON W. DUDAS
*Director of the United States Patent and Trademark Office*